United States Patent
Greenfield et al.

(10) Patent No.: US 9,317,042 B2
(45) Date of Patent: Apr. 19, 2016

(54) PITCH FEEDBACK CONTROL SPLITTING FOR HELICOPTERS WITH REDUNDANT ACTUATORS

(71) Applicant: Sikorsky Aircraft Corporation, Stratford, CT (US)

(72) Inventors: Aaron L. Greenfield, Shelton, CT (US); Ole Wulff, Ansonia, CT (US); Matthew A. White, Milford, CT (US)

(73) Assignee: SIKORSKY AIRCRAFT CORPORATION, Stratford, CT (US)

( * ) Notice: Subject to any disclaimer, the term of this patent is extended or adjusted under 35 U.S.C. 154(b) by 0 days.

(21) Appl. No.: 14/166,319

(22) Filed: Jan. 28, 2014

(65) Prior Publication Data

US 2015/0210381 A1 Jul. 30, 2015

(51) Int. Cl.
*G05D 1/08* (2006.01)
*B64C 27/10* (2006.01)

(52) U.S. Cl.
CPC .............. *G05D 1/0858* (2013.01); *B64C 27/10* (2013.01)

(58) Field of Classification Search
CPC ............................ G05D 1/0858; B64C 27/10
See application file for complete search history.

(56) References Cited

U.S. PATENT DOCUMENTS

| | | | |
|---|---|---|---|
| 5,330,131 A * | 7/1994 | Burcham et al. ............ | 244/76 R |
| 5,971,325 A | 10/1999 | Gold et al. | |
| 6,474,603 B1 | 11/2002 | Kinkead et al. | |
| 6,592,071 B2 | 7/2003 | Kinkead et al. | |
| 6,860,452 B2 | 3/2005 | Bacon et al. | |
| 6,885,917 B2 | 4/2005 | Osder et al. | |
| 8,024,079 B2 | 9/2011 | Najmabadi et al. | |
| 8,342,445 B2 | 1/2013 | Tran et al. | |
| 8,380,364 B2 | 2/2013 | Ciholas | |
| 8,463,465 B2 | 6/2013 | Piasecki | |
| 8,548,648 B2 | 10/2013 | Sahasrabudhe et al. | |
| 2003/0120399 A1 * | 6/2003 | Yamamoto ........................ | 701/4 |
| 2008/0237392 A1 * | 10/2008 | Piasecki et al. ................... | 244/6 |
| 2011/0174921 A1 | 7/2011 | Fervel et al. | |
| 2012/0253561 A1 | 10/2012 | Ellis et al. | |

FOREIGN PATENT DOCUMENTS

EP    1587733 B1    9/2010

OTHER PUBLICATIONS

Ducard, G. & Hua, M.(Sep. 14-16, 2011), Discussion and Practical Aspectes on Control Allocation for a Mutli-Rotor Helicopter, Zurich, Switzerland.*
International Search Report for application PCT/US15/12831, dated Apr. 17, 2015, 9 pages.
Written Opinion for application PCT/US15/12831, dated Apr. 17, 2015, 6 pages.

* cited by examiner

*Primary Examiner* — Mussa A Shaawat
*Assistant Examiner* — Abdhesh Jha
(74) *Attorney, Agent, or Firm* — Cantor Colburn LLP

(57) ABSTRACT

Embodiments are directed to generating, by a processing device, a feedback command for an aircraft based on a reference input and an output response of the aircraft, and analyzing, by the processing device, the feedback command to allocate control to a plurality of control surfaces over a plurality of separate frequency bands.

22 Claims, 4 Drawing Sheets

PITCH FEEDBACK CONTROL SPLITTING FOR HELICOPTERS WITH REDUNDANT ACTUATORS

BACKGROUND

On an aircraft, such as single main rotor helicopter, speed is limited by asymmetry of lift on the rotor, which creates stall on the retreating side and high power requirements on the advancing side. The X2 TECHNOLOGY™ concept/platform overcomes this restriction in speed with co-axial counter-rotating rotors in which the advancing side of each rotor provides lift and the retreating side blades are offloaded.

The co-axial configuration overcomes traditional limits on helicopter speed. However, other factors serve to limit the top speed of the co-axial configuration. These other factors include installed power, vibratory limits, and pitch stability.

Conventional techniques for improving pitch stability focus on an increase in tail volume, improved tail effectiveness, or control of aircraft center of gravity (CG). Increasing tail volume can increase the aircraft weight, tail loads, and footprint. Moreover, increasing tail volume results in undesirable tail forces for some flight conditions and maneuvers. Control of CG may be desirable from a stability perspective, but subject to many design constraints and so there will often be a limited ability to modify CG. Also, for aircraft with a canted tail rotor or lifting tail, it is desirable from a performance perspective (especially at hover) to have the CG aft of the shaft, which is bad for stability on rigid rotor aircraft.

BRIEF SUMMARY

An embodiment is directed to a method comprising: generating, by a processing device, a feedback command for an aircraft based on a reference input and an output response of the aircraft, and analyzing, by the processing device, the feedback command to allocate control to a plurality of control surfaces over a plurality of separate frequency bands.

An embodiment is directed to an apparatus for use in a rotorcraft, the apparatus comprising: at least one processor, and memory having instructions stored thereon that, when executed by the at least one processor, cause the apparatus to: generate a feedback command for the rotorcraft based on a reference input and an output response of the rotorcraft, and analyze the feedback command to allocate control to a plurality of control surfaces over a plurality of separate frequency bands.

An embodiment is directed to a co-axial rotorcraft comprising: a control computer configured to: generate a feedback command for the rotorcraft based on a reference input derived from a pilot command and an output response of the rotorcraft, and analyze the feedback command to allocate a first portion of a control to an elevator control surface and a second portion of the control to a main rotor cyclic control surface.

Additional embodiments are described below.

BRIEF DESCRIPTION OF THE DRAWINGS

The present disclosure is illustrated by way of example and not limited in the accompanying figures in which like reference numerals indicate similar elements.

DETAILED DESCRIPTION

Figure 1A:
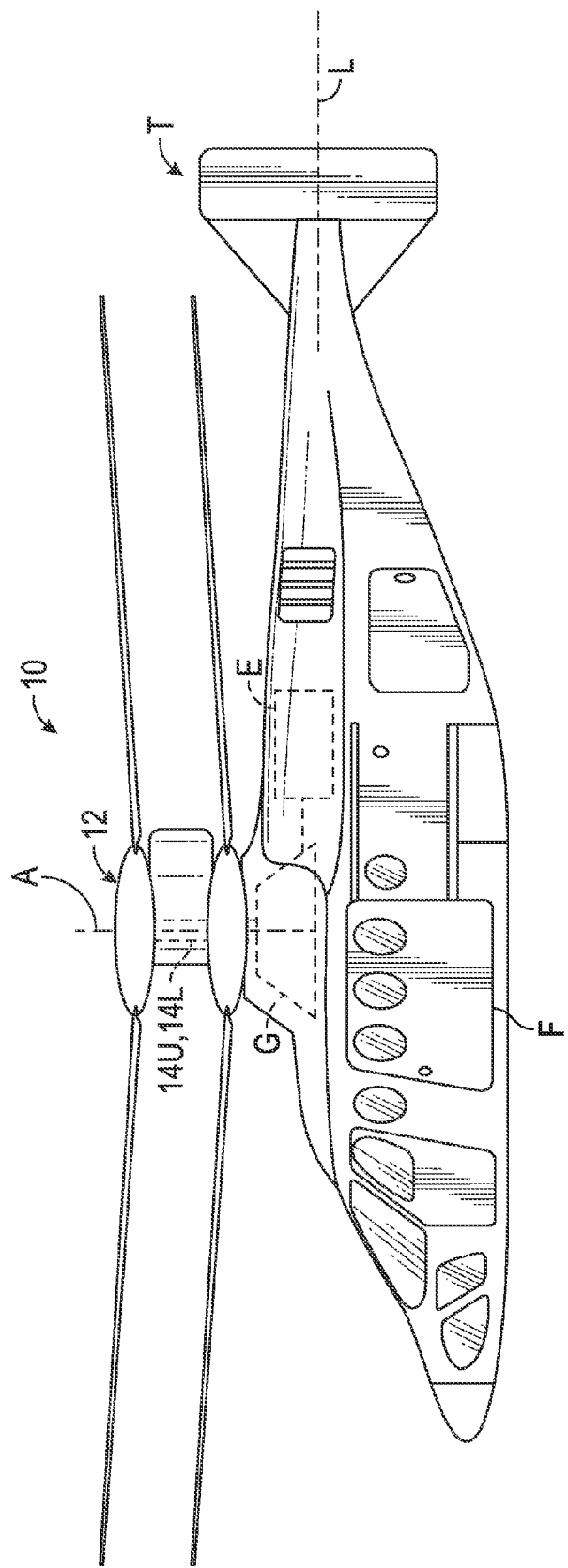
FIG. 1A is a general perspective side view of an exemplary rotary wing aircraft.

It is noted that various connections are set forth between elements in the following description and in the drawings (the contents of which are included in this disclosure by way of reference). It is noted that these connections in general and, unless specified otherwise, may be direct or indirect and that this specification is not intended to be limiting in this respect. In this respect, a coupling between entities may refer to either a direct or an indirect connection.

Exemplary embodiments of apparatuses, systems, and methods are described for enhancing pitch stability by combining characteristics of techniques of pitch control, main rotor cyclic control and elevator control. Embodiments of the disclosure enhance stability characteristics of an aircraft (e.g., a helicopter) over a maximum envelope allowed by actuator saturation and use of all available control authority.

FIG. 1A illustrates an exemplary rotary wing aircraft 10. The aircraft 10 is shown as having a dual, counter-rotating main rotor system 12, which rotates about a rotating main rotor shaft 14U, and a counter-rotating main rotor shaft 14L, both about an axis of rotation A. Other types of configurations may be used in some embodiments, such as a single rotor system 12.

The aircraft 10 includes an airframe F which supports the main rotor system 12 as well as an optional translational thrust system T which provides translational thrust during high speed forward flight, generally parallel to an aircraft longitudinal axis L.

A main gearbox G located above the aircraft cabin drives the rotor system 12. The translational thrust system T may be driven by the same main gearbox G which drives the rotor system 12. The main gearbox G is driven by one or more engines E. As shown, the main gearbox G may be interposed between the engines E, the rotor system 12, and the translational thrust system T.

Although a particular counter-rotating, coaxial rotor system aircraft configuration is illustrated in the embodiment of FIG. 1A, other rotor systems and other aircraft types such as tilt-wing and tilt-rotor aircrafts may benefit from the present disclosure.

Figure 1B:
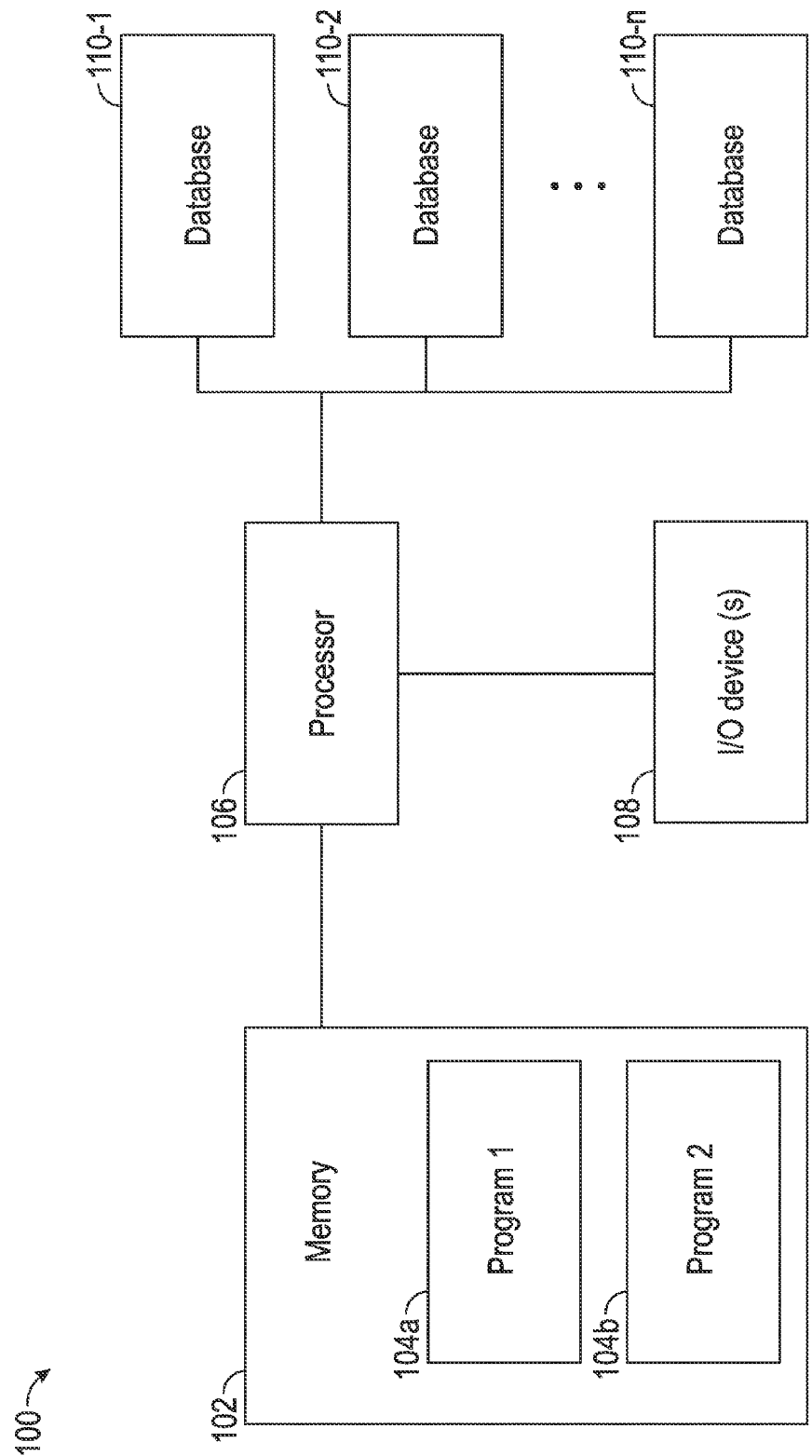
FIG. 1B is a schematic block diagram illustrating an exemplary computing system.

Referring to FIG. 1B, an exemplary computing system 100 is shown. Computing system 100 may be part of a flight control system of the aircraft 10. The system 100 is shown as including a memory 102. The memory 102 may store executable instructions. The executable instructions may be stored or organized in any manner and at any level of abstraction, such as in connection with one or more applications, processes, routines, procedures, methods, etc. As an example, at least a portion of the instructions are shown in FIG. 1B as being associated with a first program 104a and a second program 104b.

The instructions stored in the memory 102 may be executed by one or more processors, such as a processor 106. The processor 106 may be coupled to one or more input/output (I/O) devices 108. In some embodiments, the I/O device(s) 108 may include one or more of a keyboard or keypad, a touchscreen or touch panel, a display screen, a microphone, a speaker, a mouse, a button, a remote control, a control stick, a joystick, a printer, a telephone or mobile device (e.g., a smartphone), etc. The I/O device(s) 108 may be configured to provide an interface to allow a user to interact with the system 100.

As shown, the processor 106 may be coupled to a number 'n' of databases, 110-1, 110-2, . . . 110-n. The databases 110 may be used to store data, such as data obtained from one or more sensors (e.g., accelerometers). In some embodiments, the data may pertain to one or more parameters associated with main rotor cyclic feedback control and elevator control.

The system 100 is illustrative. In some embodiments, one or more of the entities may be optional. In some embodiments, additional entities not shown may be included. In some embodiments, the entities may be arranged or organized in a manner different from what is shown in FIG. 1B. For example, in some embodiments, the memory 102 may be coupled to or combined with one or more of the databases 110.

Embodiments of the disclosure may be used to combine characteristics of main rotor cyclic feedback control with elevator control via control splitting of pitch feedback. The main rotor control surface may have the benefit of higher pitch moment producing capability (e.g., more authority) when compared to the elevator surface. The elevator surface may have a benefit of faster speed (e.g., more phase) of response when compared to the main rotor, which results in increased stability. The control range of both surfaces may be constrained by packaging and weight considerations, so greater overall pitch control can be achieved by using both surfaces to the maximum range possible. Additionally, loading and performance considerations, in addition to stability and control range considerations, may lead to differences in desired allocation between the feedback control of the two surfaces.

Figure 2:
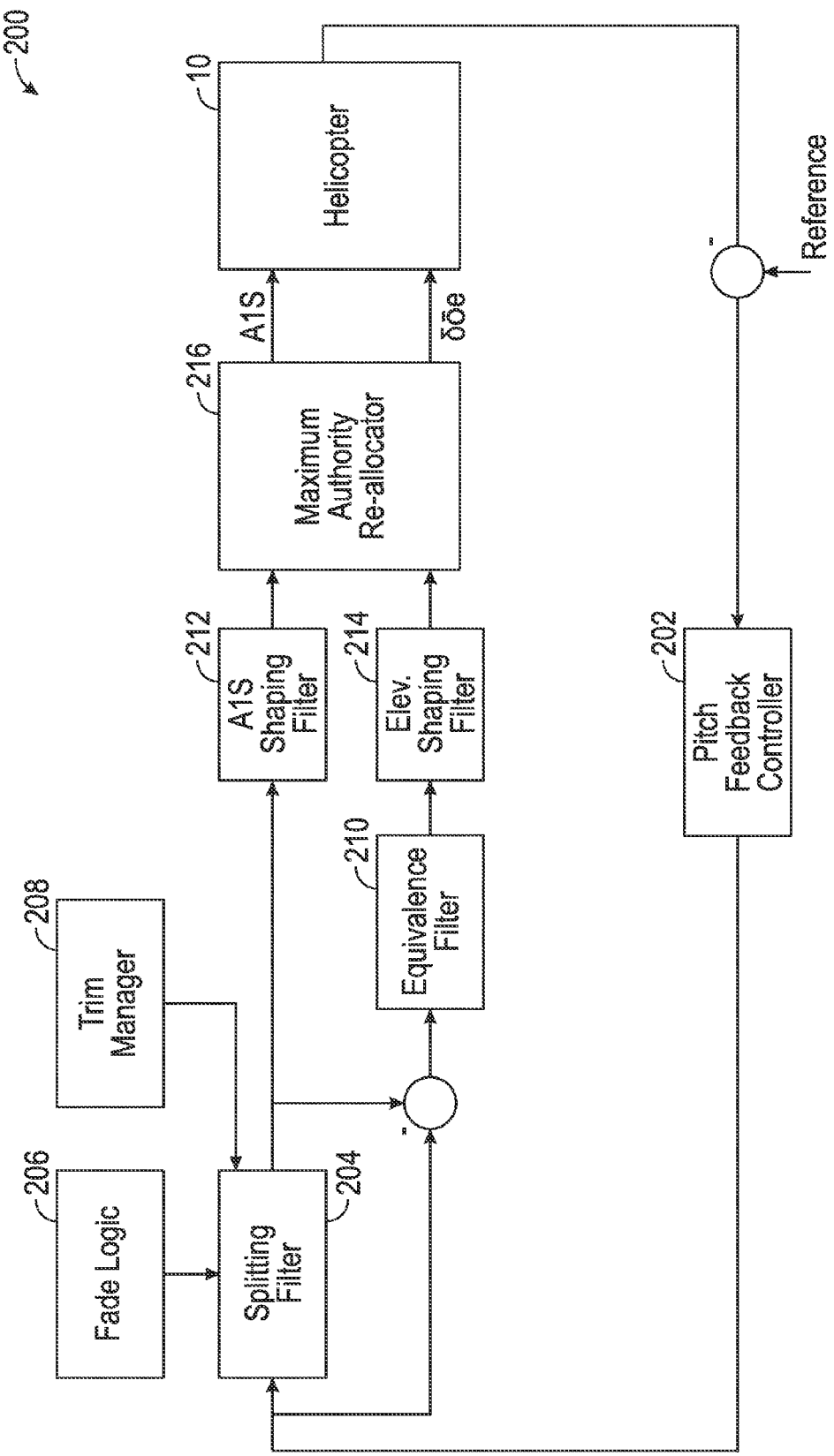
FIG. 2 is a block diagram of an exemplary system environment.

Referring now to FIG. 2, a system 200 is shown. The system 200 may be associated with, or include, an aircraft (e.g., aircraft 10 of FIG. 1A) and/or the computing system 100 of FIG. 1B. The system 200 may be implemented in a closed-loop fashion in order to enable a helicopter's response to smoothly converge to input pilot commands.

The system 200 may include a pitch feedback controller 202. The controller 202 may convert pitch rate, pitch attitude, and other desired pitch axis related parameters or feedback (e.g., error) into a pitch axis feedback command. A single pitch axis feedback command may be generated, rather than multiple independent actuator commands, which may allow for analysis of the total pitch axis response. The pitch feedback controller 202 may be operative on the difference between a reference input and the (actual) output response of the helicopter 10 in generating the pitch axis feedback command. The reference may be derived from one or more pilot commands.

The system 200 may include a pitch feedback splitting filter 204. The filter 204 may separate the pitch feedback command into commands for each separate actuator, specifically, elevator and main rotor pitch cyclic commands. Fade logic 206 and a trim manager 208 may control the manner in which the filter 204 operates. Fade logic 206, for example, may fade out use of the elevator at low airspeeds where it is ineffective as a control surface. The filter 204 may be implemented as a second order (e.g., second order over second order) filter, which may allow for three separate frequency bands for pitch control: (1) a low frequency band, (2) a mid-frequency band, and (3) a high frequency band. Two or more of the bands may at least partially overlap. The bands may be distinct, in that they might not share any frequencies in common with one another. Each band may have an allocation gain associated with it which is used to partition the control within that frequency band to different actuators. Due to faster speed of response, for example, the elevator may be allocated a large fraction of the high-frequency control (e.g., greater than three hertz). Due to the large moment capability, and drag advantages, most of the low frequency control (e.g., less than three hertz) may be allocated to the main rotor cyclic. The trim manager 208 can amplify the distribution of low frequency control by changing the low-frequency allocation gain.

The system 200 may include an equivalence filter 210. The filter 210 may include a model or algorithm that converts control of one surface (e.g., main rotor cyclic) into an equivalent amount of control in the other surface (e.g., elevator control). The filter 210 may ensure that the filter 204 partitions control between two equivalent surfaces. This may be useful for shifting control between the two surfaces in a transient-free manner.

The system 200 may include an A1S shaping filter 212 and an elevator shaping filter 214. The filter 212 and the filter 214 may provide additional capabilities to perform frequency shaping of the control on each surface. This includes canceling the effects of rotor and structural aircraft modes. Independent filters 212 and 214 may be provided since different shaping may be required for different properties of each control surface.

The system 200 may include a maximum authority re-allocator 216. The re-allocator 216 may be configured to avoid control surface saturation. For example, the re-allocator 216 may allow for full usage of each control surface up to the point of saturation of that control surface. Saturation of a surface or actuator may be due to position, rate or acceleration limits having been reached. Authority reallocation can thus be based on a surface hitting any of these limits.

When a given surface saturates, the additional desired pitch control on that surface may be re-allocated to the other pitch control surface. The filter 210 may be used during this re-allocation to ensure that the equivalent amount of control is applied to the other surface as would have been applied to the saturating surface. The re-allocator 216 may be bi-directional, that is, control saturation on each surface may be re-allocated to the other surface. An inversion of the filter 210 may be used to re-allocate control in the "opposite" or second direction.

The splitting filter 204 may be parameterized with two frequency bands, a low-frequency band and a high-frequency band. Table 1 shows the relationships of the frequency bands for a first order split and a second order split

TABLE 1

Splitting Filter Relationships With Two Frequency Bands

| | Low-frequency band | High-frequency band |
| --- | --- | --- |
| $1^{st}$ order split | $\dfrac{1}{\tau s + 1}$ | $\dfrac{\tau s}{\tau s + 1}$ |
| $2^{nd}$ order split | $\dfrac{\omega^2}{s^2 + 2\varepsilon\omega^2 + \omega^2}$ | $\dfrac{2\varepsilon\omega^2 + \omega^2}{s^2 + 2\varepsilon\omega^2 + \omega^2}$ |

For purposes of trim management, the splitting filter 204 may be parameterized with three frequency bands. Table 2 represents an example of the relationships for a low, medium, and high-frequency band configuration.

TABLE 2

Splitting Filter Relationships With Three Frequency Bands

| Low-frequency band | Medium-frequency band | High-frequency band |
|---|---|---|
| $\dfrac{1}{\tau_1 s + 1}$ | $\dfrac{\tau_1 s}{\tau_1 s + 1} \dfrac{1}{\tau_2 s + 1}$ | $\dfrac{\tau_1 s}{\tau_1 s + 1} \dfrac{\tau_2 s}{\tau_2 s + 1}$ |

The equivalence filter 210 may be used as a gain between elevator and A1S authority. The filter 210 may be used as a gain*lead-lag (a similar filter may be used in feed-forward equivalence). Gain*lead-lag may capture dynamic differences up to 2 Hz.

The A1S shaping filter 212 (and similarly, the elevator shaping filter 214) may include one or more filters, such as high frequency roll-off plus mode cancellation filters. As described above, the filters 212 and 214 may be implemented separately to accommodate for differences in a main rotor control surface and an elevator surface.

The trim manager 208 may drive the trim elevator around for saturation avoidance (A1S or elevator), to optimize trim load, or to optimize performance. The trim manager 208 may function by changing one or more coefficients of a low-frequency band in the split.

As described above, the maximum authority re-allocator 216 may push control activity from A1S to elevator (or vice versa) if control associated with one surface is saturated but the other is not.

Embodiments of the disclosure may be used to account for failure mode conditions. For example, if a plurality of control surfaces (e.g., two independent elevator control surfaces) are available, and at least one of the control surfaces fails (e.g., a first elevator control surface fails), control may be re-allocated from the failed control surface(s) (e.g., the first elevator control surface) to one or more of the other control surfaces (e.g., a second elevator control surface).

Figure 3:
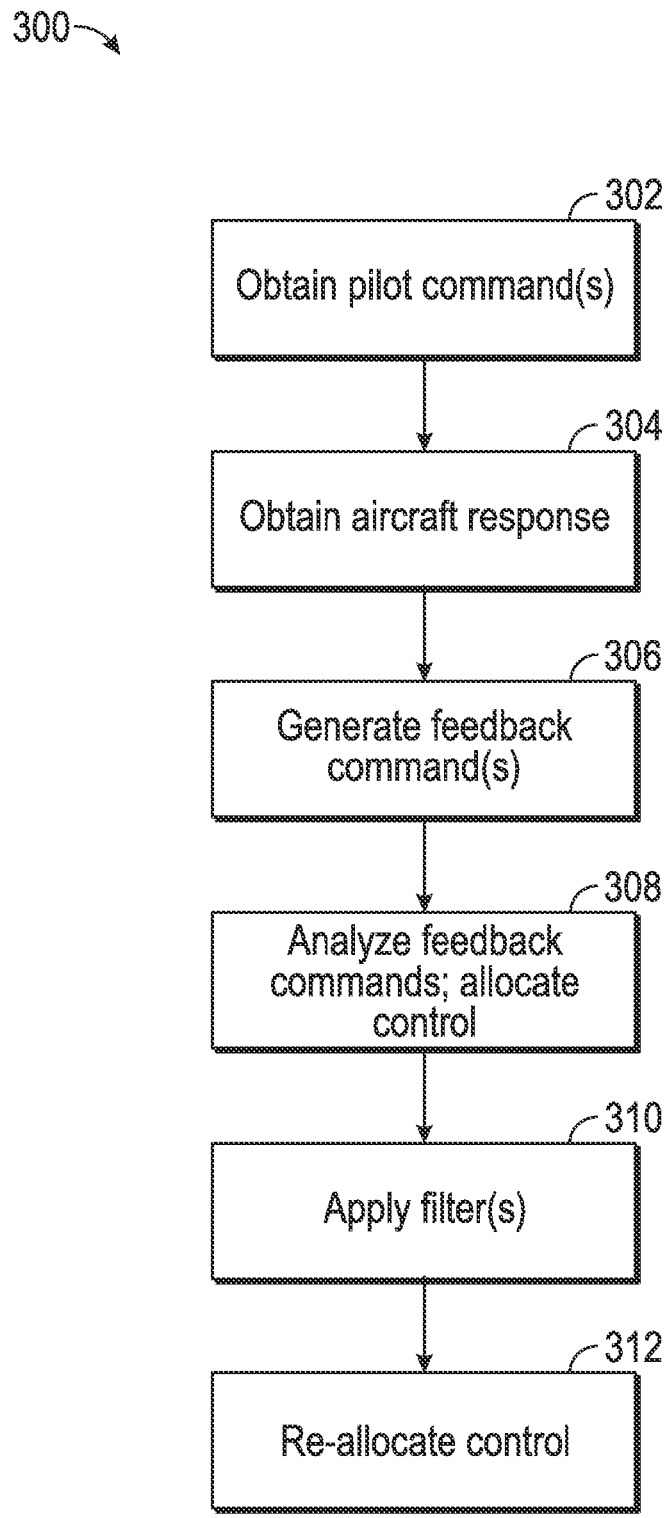
FIG. 3 illustrates a flow chart of an exemplary method.

Turning now to FIG. 3, a flow chart of an exemplary method 300 is shown. The method 300 may be executed by one or more systems, components, or devices, such as those described herein (e.g., the system 100 and/or the system 200). The method 300 may be used to allocate control in connection with a plurality of control surfaces of an aircraft (e.g., a rotorcraft).

In block 302, one or more pilot commands may be obtained. The commands may provide for one or more operations that the pilot would like the aircraft to undertake.

In block 304, an actual output response of the aircraft may be obtained.

In block 306, one or more feedback commands may be generated. The feedback command(s) may be selected so as to cause the actual output response of the aircraft (e.g., block 304) to converge to the pilot commands (e.g., block 302).

In block 308, the feedback command(s) of block 306 may be analyzed. As part of the analysis, control (e.g., pitch control) may be allocated to one or more control surfaces (e.g., elevator and main rotor pitch control surfaces) in one or more frequency bands.

In block 310, one or more filters may be applied to the control allocated to the one or more control surfaces. For example, independent filters may be associated with each type of control surface. The filters may be used to remove undesired dynamic characteristics.

In block 312, control associated with one or more control surfaces may be re-allocated to one or more other control surfaces. Such re-allocation may occur based on a saturation of a control surface. Such re-allocation may occur based on a failure of a control surface.

The method 300 is illustrative. In some embodiments, one or more of the blocks or operations (or a portion thereof) may be optional. In some embodiments, one or more additional blocks or operations not shown may be included. In some embodiments, the blocks or operations may execute in an order or sequence that is different from what is shown in FIG. 3.

Embodiments of the disclosure may be used to increase pitch stability without incurring the cost associated with additional tail weight. Pitch moment capability may be increased, thereby improving the maneuverability of an aircraft.

Embodiments of the disclosure provide pitch feedback control splitting between an elevator and main rotor pitch cyclic on a co-axial rotorcraft. Aspects of this disclosure may be applied in any environment, system, or application where multiple redundant control surfaces are available.

As described herein, in some embodiments various functions or acts may take place at a given location and/or in connection with the operation of one or more apparatuses, systems, or devices. For example, in some embodiments, a portion of a given function or act may be performed at a first device or location, and the remainder of the function or act may be performed at one or more additional devices or locations.

Embodiments may be implemented using one or more technologies. In some embodiments, an apparatus or system may include one or more processors, and memory storing instructions that, when executed by the one or more processors, cause the apparatus or system to perform one or more methodological acts as described herein. Various mechanical components known to those of skill in the art may be used in some embodiments.

Embodiments may be implemented as one or more apparatuses, systems, and/or methods. In some embodiments, instructions may be stored on one or more computer-readable media, such as a transitory and/or non-transitory computer-readable medium. The instructions, when executed, may cause an entity (e.g., an apparatus or system) to perform one or more methodological acts as described herein.

Aspects of the disclosure have been described in terms of illustrative embodiments thereof. Numerous other embodiments, modifications and variations within the scope and spirit of the appended claims will occur to persons of ordinary skill in the art from a review of this disclosure. For example, one of ordinary skill in the art will appreciate that the steps described in conjunction with the illustrative figures may be performed in other than the recited order, and that one or more steps illustrated may be optional.

What is claimed is:

1. A method comprising:
generating, by a processing device, a feedback command for an aircraft based on a difference between a reference input and an actual output response of the aircraft;
analyzing, by the processing device, the feedback command to allocate control to a plurality of control surfaces over a plurality of separate frequency bands;
applying an equivalence filter to the control that converts control of a first of the plurality of control surfaces into an equivalent amount of control in a second of the plurality of control surfaces to enable allocation over dynamically equivalent control surfaces; and
applying an inversion of the equivalence filter to re-allocate control in an opposite or second direction.

2. The method of claim 1, wherein at least two of the plurality of separate frequency bands partially overlap.

3. The method of claim 1, further comprising:
applying an independent shaping filter to the control associated with each of the control surfaces.

4. The method of claim 1, further comprising:
determining that the first of the control surfaces is saturated; and
re-allocating a portion of the control allocated to the first of the control surfaces to at least the second of the control surfaces based on the determination that the first control surface is saturated.

5. The method of claim 4, further comprising:
subsequent to re-allocating the portion of the control to the at least a second of the control surfaces, determining that the second of the control surfaces is saturated; and
re-allocating a second portion of the control associated with the second control surface to at least one other control surface.

6. The method of claim 5, wherein the at least one other control surface comprises the first control surface.

7. The method of claim 1, wherein the control is allocated based on airspeed.

8. The method of claim 1, wherein the first of the control surfaces comprises an elevator control surface and the second of the control surfaces comprises a main rotor cyclic control surface.

9. The method of claim 1, wherein a coefficient of a low-frequency band is modified to avoid saturation, optimize trim load, or optimize performance.

10. An apparatus for use in a rotorcraft, the apparatus comprising:
at least one processor; and
memory having instructions stored thereon that, when executed by the at least one processor, cause the apparatus to:
generate a feedback command for the rotorcraft based on a difference between a reference input and an actual output response of the rotorcraft;
analyze the feedback command to allocate control to a plurality of control surfaces over a plurality of separate frequency bands;
apply an equivalence filter to the control that converts control of a first of the surfaces into an equivalent amount of control in a second of the surfaces to enable allocation over dynamically equivalent control surfaces; and
apply an inversion of the equivalence filter to re-allocate control in an opposite or second direction.

11. The apparatus of claim 10, wherein the instructions, when executed by the at least one processor, cause the apparatus to:
apply an independent shaping filter to the control associated with each of the control surfaces.

12. The apparatus of claim 10, wherein the instructions, when executed by the at least one processor, cause the apparatus to:
determine that the first of the control surfaces is saturated based on a determination that a limit is reached in terms of at least one of: position, rate, and acceleration; and
re-allocate a portion of the control allocated to the first of the control surfaces to at least the second of the control surfaces based on the determination that the first control surface is saturated.

13. The apparatus of claim 12, wherein the instructions, when executed by the at least one processor, cause the apparatus to:
subsequent to re-allocating the portion of the control to the at least a second of the control surfaces, determine that the second of the control surfaces is saturated; and
re-allocate a second portion of the control associated with the second control surface to at least one other control surface.

14. The apparatus of claim 13, wherein the at least one other control surface comprises the first control surface.

15. The apparatus of claim 10, wherein the control is allocated based on airspeed.

16. The apparatus of claim 10, wherein the first of the control surfaces comprises an elevator control surface and the second of the control surfaces comprises a main rotor cyclic control surface.

17. The apparatus of claim 10, wherein the feedback command comprises a pitch axis feedback command based on at least one of: pitch rate, pitch attitude, and feedback error.

18. The apparatus of claim 10, wherein the instructions, when executed by the at least one processor, cause the apparatus to:
determine that the first of the control surfaces has failed; and
re-allocate a portion of the control allocated to the first of the control surfaces to at least the second of the control surfaces based on determining that the first of the control surfaces has failed.

19. A co-axial rotorcraft comprising:
a control computer configured to:
generate a feedback command for the rotorcraft based on a difference between a reference input derived from a pilot command and an actual output response of the rotorcraft;
analyze the feedback command to allocate a first portion of a control to an elevator control surface and a second portion of the control to a main rotor cyclic control surface;
apply an equivalence filter to the control that converts control of the elevator control surface into an equivalent amount of control in the main rotor cyclic control surface to enable allocation over dynamically equivalent control surfaces; and
apply an inversion of the equivalence filter to re-allocate control in an opposite or second direction.

20. The co-axial rotorcraft of claim 19, wherein the control computer is configured to allocate the first and second portions of the control over a plurality of distinct frequency bands.

21. The co-axial rotorcraft of claim 19, wherein the control computer is configured to:
determine that the elevator control surface is saturated; and
re-allocate at least a third portion of the first portion of the control allocated to the elevator control surface to the main rotor cyclic control surface based on the determination that the elevator control surface is saturated.

22. The co-axial rotorcraft of claim 21, wherein the control computer is configured to:
subsequent to re-allocating the third portion of the first portion of the control to the main rotor cyclic control surface, determine that the main rotor cyclic control surface is saturated; and
re-allocate at least a fourth portion of the second portion of the control associated with the main rotor cyclic control surface to at least one other control surface.

* * * * *